United States Patent
Shaw et al.

(10) Patent No.: US 8,059,607 B1
(45) Date of Patent: Nov. 15, 2011

(54) METHODS AND SYSTEMS FOR IMPLEMENTING TRANSMIT DIVERSITY OVER A WIRELESS MEDIUM AND NETWORKS USING THE SAME

(75) Inventors: Michael J. Shaw, El Dorado Hills, CA (US); Daniel R. Dillon, Fair Oaks, CA (US); Graham Smith, El Dorado Hills, CA (US)

(73) Assignee: Cirrus Logic, Inc., Austin, TX (US)

( * ) Notice: Subject to any disclaimer, the term of this patent is extended or adjusted under 35 U.S.C. 154(b) by 3084 days.

(21) Appl. No.: 10/607,329

(22) Filed: Jun. 26, 2003

(51) Int. Cl.
  *H04Q 7/00* (2006.01)
  *H04L 27/04* (2006.01)
  *H04B 1/02* (2006.01)

(52) U.S. Cl. ........ 370/334; 370/329; 370/338; 375/295; 455/91; 455/101

(58) Field of Classification Search .......... 375/130–299; 455/65–522; 370/329–392
See application file for complete search history.

(56) References Cited

U.S. PATENT DOCUMENTS

| | | | | |
|---|---|---|---|---|
| 5,689,439 A | * | 11/1997 | Weerackody et al. | 370/329 |
| 6,898,198 B1 | * | 5/2005 | Ryan et al. | 370/338 |

* cited by examiner

*Primary Examiner* — Afsar M. Qureshi
(74) *Attorney, Agent, or Firm* — Thompson & Knight LLP; James J. Murphy (57) ABSTRACT

A spatial transmit diversity method includes transmitting data at a selected rate from a first antenna and awaiting an acknowledgement indicating successful receipt by the receiving terminal of the data transmitted at the selected rate from the first antenna. The data are then transmitted at the selected rate from a second antenna upon failure to receive an acknowledgement of successful receipt by the receiving terminal of the data transmitted at the selected rate from the first antenna within a predetermined time interval.

20 Claims, 7 Drawing Sheets

METHODS AND SYSTEMS FOR IMPLEMENTING TRANSMIT DIVERSITY OVER A WIRELESS MEDIUM AND NETWORKS USING THE SAME

FIELD OF INVENTION

The present invention relates in general to wireless networked systems and, in particular, to methods and systems for implementing transmit diversity over a wireless medium and networks using the same.

BACKGROUND OF INVENTION

Hard-wired local area networks (LANs) have developed significantly since the inception of the Ethernet over two decades ago. Today, hard-wired LANs which are relatively inexpensive, fast, and reliable are widely available for both private and public applications. Businesses, educational institutions, governmental and other public entities have all significantly benefited from the ability of hard-wired LANs to electronically exchange information between physically separated network terminals. However, hard-wired LANs are clearly subject to the constraints imposed by the required physical infrastructure, and, in particular, to limitations on the mobility of individual network terminals as a consequence of the immediate availability or unavailability of the appropriate physical interconnect.

In view of the limitations on hard-wired LANs, as well as significant advances in wireless communication technologies, the development of standardized wireless LANs (WLANs) has been the next logical step. One particular standard which defines protocols for WLANs is ANSI/IEEE Std. 802.11 Wireless LAN Medium Access Control and Physical Layer Specifications. This standard is one of the ANSI/IEEE 802 family of standards applicable to both local and metropolitan area networks. Additionally, ANSI/IEEE Std. 802.11 is associated with a number of released, and proposed (draft) supplemental standards, including draft supplemental standard ANSI/IEEE Std. 802.11e MAC Enhancements for Quality of Service.

Quality of service (QoS) considerations are critical for supporting multimedia (audio/video) applications which require increased control over transmission rates, latency and error rates. QoS over a WLAN presents considerable challenges since changes in the wireless medium may significantly affect each of these parameters and consequently the quality of the presentation at the receiving terminal. In addition, different data categories require different priorities and different transmission strategies. For example, voice transmissions are more tolerant to latencies and data errors than multimedia transmissions in which data errors and latency are able to impede generation of a smooth, high quality presentation. On the other hand, text and relatively static display data have an even higher tolerance to errors and latency and therefore typically do not require the utilization of complex QoS mechanisms.

Even in view of draft supplementary standard ANSI/IEEE Std. 802.11e, many problems remain to be resolved with respect to the actual implementation of QoS principles in WLAN systems. Addressing these problems in a cost efficient manner has become a priority in the WLAN industry since consumers increasingly expect information processing systems to both support high-quality multimedia applications and provide the higher degree of convenience afforded by wireless communications.

One problem that is often encountered in wireless communication systems, such as wireless LANs and cellular telephony, is multipath fading. Multipath fading occurs when a signal is transmitted in an environment including one or more reflectors, which cause the signal to take multiple paths from the transmitting node to the receiving node. The direct signal from the transmitting node to the receiving node and each of the reflected signals normally differ in phase and/or amplitude when reaching the receiving node, and therefore constructively and destructively combine resulting in distortion. The problem of multipath fading is compounded when reflective or absorptive objects within the transmission environment and/or one or more of the transmitting and receiving nodes themselves are moving.

SUMMARY OF INVENTION

The principles of the present invention advantageously provide efficient methods and systems for implementing transmit diversity techniques in wireless communications systems, such as wireless computer networks and the like. According to one particular embodiment, a spatial transmit diversity method is disclosed which includes transmitting data at a selected rate from a first antenna and awaiting an acknowledgement indicating successful receipt of the data transmitted at the selected rate from the first antenna by a receiving terminal. The data are then re-transmitted at the selected rate from a second antenna upon failure to receive an acknowledgement of successful receipt by the receiving terminal of the data transmitted at the selected rate from the first antenna within a predetermined time interval.

A further embodiment of these principles includes awaiting an acknowledgement indicating successful receipt by the receiving terminal of the data transmitted at the selected rate from the second antenna, and transmitting data at a reduced rate from the first antenna upon failure to receive an acknowledgement of successful receipt by the receiving terminal of the data transmitted at the selected rate from the second antenna within a predetermined time interval.

Application of the inventive principles is particularly advantageous in shared medium environments having one or more reflectors within the vicinity of a set of transmitting and receiving terminals. When the path from one transmit antenna to the receiver cannot support the desired data transfer, due to multipath fading and similar effects caused by the reflectors in the shared environment, the transmit antenna is switched to provide a new transmission path. If new transmission path still does not support the desired data transfer, the transmit antenna is switched again and the data rate is also reduced. The processes of switching antennae and reducing data rates is repeated unit a suitable transmission path is established between the transmitting and receiving terminals.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1:
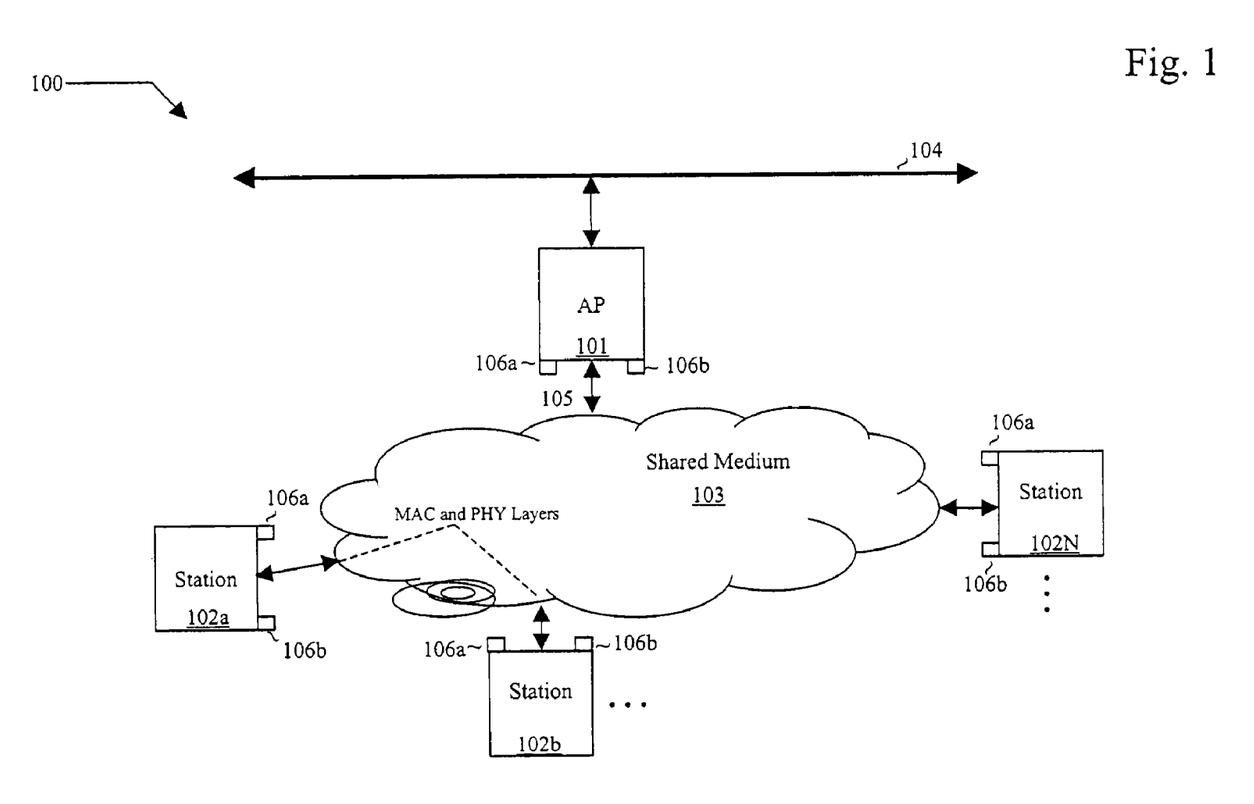
FIG. 1 is a high level block diagram of a representative Basic Service Set (BSS) within an ANSI/IEEE Std. 802.11 wireless local area network (WLAN)

FIG. 1 is a high level block diagram of a Basic Service Set (BSS) 100 forming a portion of an infrastructure WLAN in accordance with ANSI/IEEE Std. 802.11 (hereafter the "802.11 standard"). BSS 100 includes an Access Point (AP) 101 that is in wireless communication with a set of N number of information processing terminals or stations 102a,b . . . N through a wireless (shared) medium 103 (e.g. "air" as the shared medium, in this example). N is an integer greater than or equal to one (1). AP 101 also provides a connection to an associated hard-wired infrastructure 104, such as a hard-wired, local area network (LAN).

The physical (PHY) layer specified by the 802.11 standard defines the signaling and interface techniques for wireless information exchange between AP 101 and stations 102a, b . . . N via shared medium 103, such as by direct sequence spread spectrum, frequency-hopping spread spectrum, or infrared (IR) pulse modulation. The 802.11 standard also specifies a Medium Access Control (MAC) layer, which is the primary focus of the present discussion, defining the protocols for the orderly exchange of data between AP 101 and stations 102a,b . . . N using the PHY layer. The MAC layer essentially includes both firmware and hardware that controls timing, transmit state machines and receive state machines. In the illustrated embodiment, each of AP 101 and Stations 102a,b, . . . , N is associated with a pair of antennae 106a and 106b for transmitting and receiving signals exchanged via shared medium 103.

The basic 802.11 standard MAC protocol is a Distributed Coordination Function (DCF) scheme (e.g., "listen-before talk" scheme) based on Carrier Sense Multiple Access (CSMA). Data are exchanged as MAC Service Data Units (MSDUs) of up to 2304 bytes in length. DCF accesses to the share medium generally provide the lowest latency for bursty accesses.

Figure 2A:
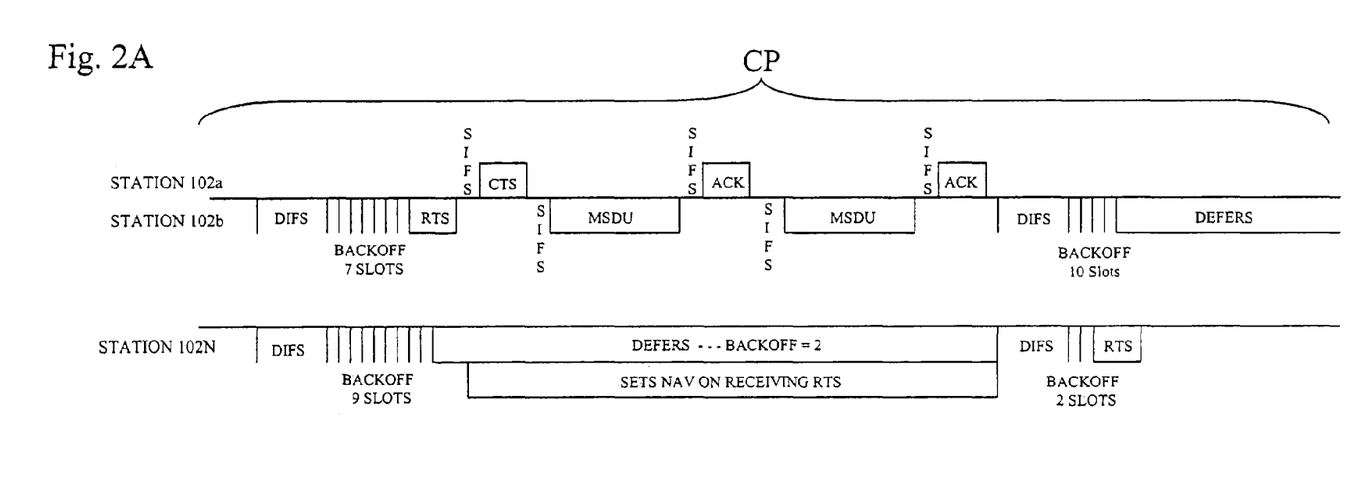
FIG. 2A is a diagram of an exemplary Distributed Coordination Function (DCF) access across the wireless medium shown in FIG. 1.

An exemplary DCF access is shown in FIG. 2A. Generally, DCF accesses are performed during a contention period (CP). A given Station 102a,b . . . N transmits MSDUs only after sensing that a channel across shared medium 103 is available (e.g., no other station 102a,b . . . N is transmitting across that channel). However, if two or more stations 102a,b . . . N simultaneously sense a channel across the shared medium as being free, a collision may occur. Therefore, the 802.11 standard also implements collision avoidance (CA) mechanism at the MAC layer.

In particular, to minimize the probability of collisions, each station 102a,b . . . N attempting to access the channel first waits until the transmission channel remains clear for a time period referred to as the DCF Interframe Space (DIFS) and then for an additional random backoff period defined in number of transmission slot times. If the channel remains clear through both the DIFS and the additional random period, the corresponding transmitting stations 102a,b . . . N transmits its data.

In the example shown in FIG. 2A, Station 102a and Station 102N both sense the same channel across shared medium 103 as being clear after the DIFS period. Station 102a then waits for seven (7) back-off slots and Station 102N for nine (9) back-off slots. Since Station 102a detects a channel clear condition two (2) slots prior to Station 102N reaching the end of its backoff period, Station 102a therefore detects the channel as free is granted the transmission rights. Station N 102N detects a channel busy condition and holds-off its transmission.

A successful transmission from Station 1 102a is acknowledged with an acknowledge frame (ACK) by the receiving Station 102b in FIG. 2A, while an unsuccessful transmission remains unacknowledged. The backoff value for the transmitting Station 102 increases with each successive failure (up to a maximum value). The transmitting Station 102a then monitors the channel through the new backoff period and then retransmits. After a successful transmission, the transmitting Station 102a has a new random backoff period.

Any stations 102a,b . . . N, which must defer from accessing the channel during transmission by another station 102a, b . . . N, continue to count down from the value of their backoff values remaining at the time of deferral after sensing the channel as free following the next DIFS period. For example, Station 102N continues to countdown from two (2) during the second DIFS period shown in FIG. 2A. Since the probability that two stations 102a,b . . . N having the same random backoff period is small, the probability of packet collisions on the channel is correspondingly small.

The inherent problem of hidden stations in CSMA systems is minimized using a Request-to-Send/Clear-to-Send (RTS/CTS) mechanism. Hidden stations are those stations 102c, d . . . N which are not within the communications region of the transmitting Station 102a but are nonetheless within the communications region of the target receiving Station 102b. The hidden station problem typically occurs because the transmitting Station 102a cannot detect a concurrent transmission from a hidden Station 102c,d, . . . , N to the target receiving Station 102b. To avoid a collision, the transmitting Station 102a therefore sends an RTS frame at the beginning of the transmission and after Short Interframe Space (SIFS) period, the receiving Station 102b returns a CTS frame. In FIG. 2A, granted transmitting Station 102a sends the RTS frame and receiving Station 102b returns the CTS frame. The RTS and CTS frames carry data which indicate to hidden stations 102c,d, . . . , N the time period required for transmission of the following data frame such that the hidden stations 102c, d, . . . , N can hold-off any attempts to transmit data. Specifically, any deferring station (in FIG. 2A, Station 102N) sets a timer (Network Allocation Vectors or NAVs), which hold-off attempts to transmit during the expected transmit time for the current frame on the channel by the transmitting Station 102a.

Figure 2B:
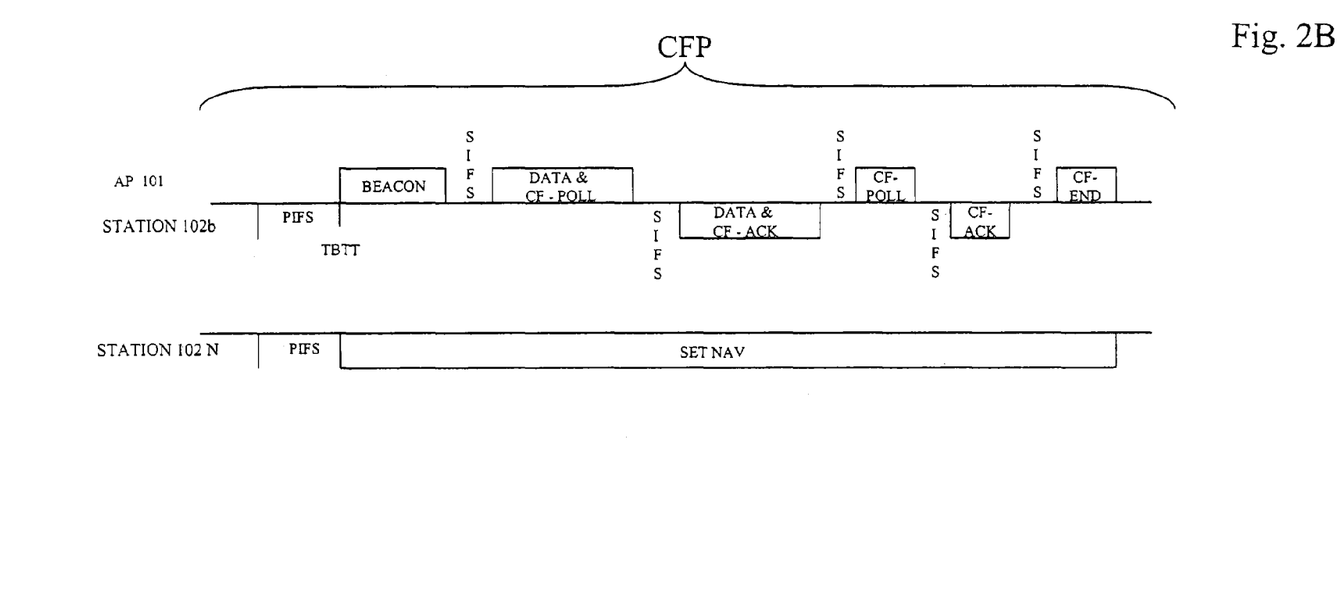
FIG. 2B is a diagram of an exemplary Point Coordination Function (PCF) access across the wireless medium shown in FIG. 1.

The 802.11 standard also defines a Point Coordination Function (PCF), which supports the execution of time-bounded data exchanges. PCF accesses are normally performed during the Contention Free Period (CFP), an example of which is shown in FIG. 2B. Typically, CFPs and CPs alternate in time. PCF accesses are more advantageous when the traffic on the shared medium is relatively predictable. However, PCF accesses are not necessarily the most efficient type of accesses for the exchange of bursty traffic.

In the case of PCF accesses, a Point Coordinator (PC), typically part of AP 101, coordinates PCF communications. During the CFP, PCF accesses are made to shared medium 103 while basic DCF accesses are still made during the CP period.

Generally, during a CFP, the PC within AP 101 sends a combination poll and data frame to a target Station 102b (the DATA & CF-POLL frame in FIG. 2B). A beacon frame BEACON maintains synchronization. Upon successful polling and receipt of the data from the PC, the target Station 102b acknowledges a successful transmission with data and an acknowledge frame (the DATA & CF ACK frame in FIG. 2B). On the other hand, if the target Station 102b does not acknowledge after the expiration of a PCF Interframe Space (PIFS), the PC polls one or more other stations or terminates the CFP (in FIG. 2B, the CFP is terminated with a CF-END frame). All deferring stations 102a,c,d, . . . , N set their NAVs and hold-off. In FIG. 2B, AP 101 is exchanging data with Station 102b and Station 102N is deferring.

Figure 3:
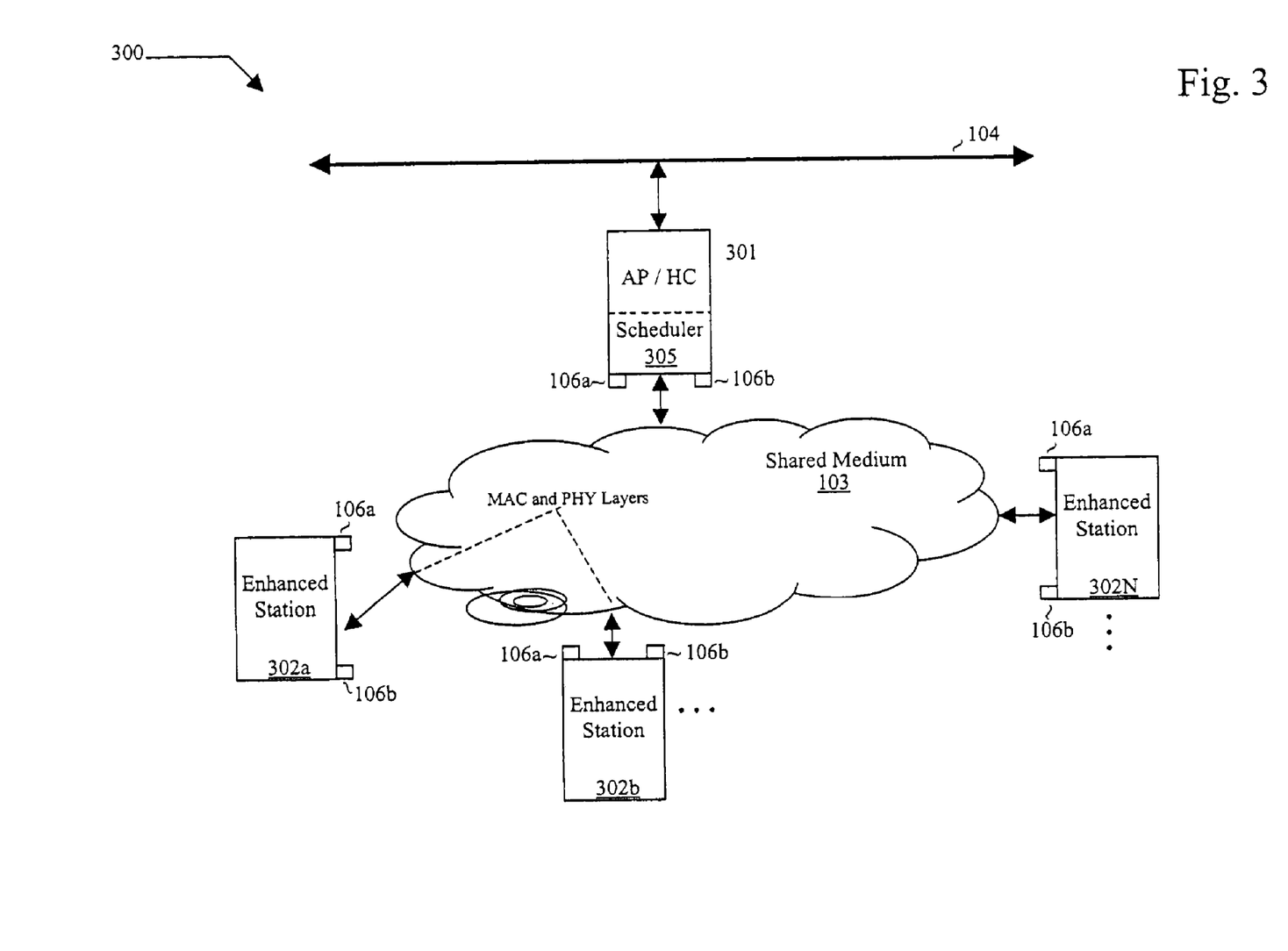
FIG. 3 is a high level block diagram of a representative enhanced BSS or QBSS for Quality of Service (QoS) WLAN communications in accordance with draft supplemental standard ANSI/IEEE Std. 802.11e.

Draft supplemental standard ANSI/IEEE Std. 802.11e ("the 802.11e standard") defines an enhanced MAC protocol for WLANs. As illustrated in FIG. 3, under the 802.11e standard, an enhanced BSS is designated as QBSS 300. AP/PC 107 becomes an AP/Hybrid Coordinator (AP/HC) 301, and the stations are designated at Enhanced Stations 302a,b . . . N.

Figure 4:
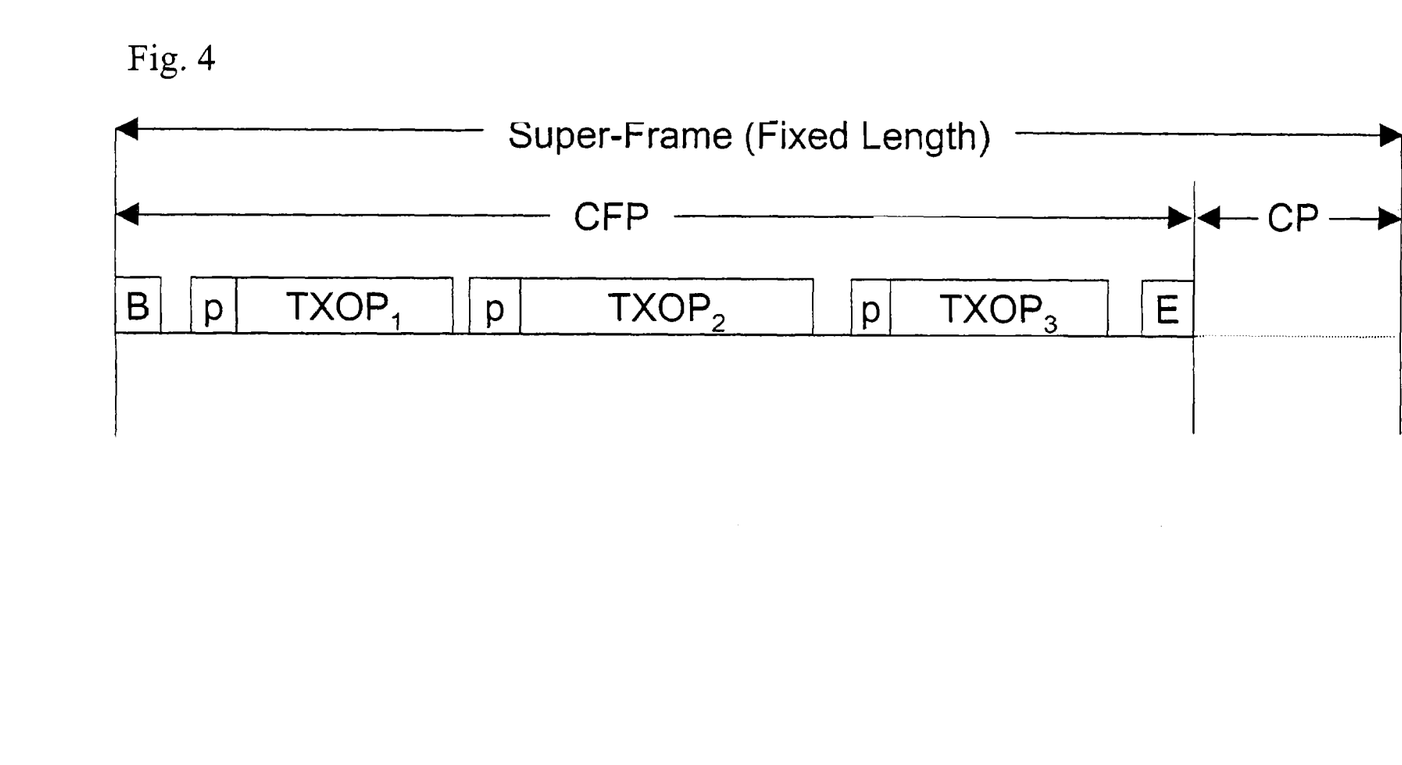
FIG. 4 is a diagram of an exemplary superframe utilized to transmit data in the system of FIG. 3.

Data are transmitted as superframes. A representative superframe is shown in FIG. 4. Each superframe includes a beacon (B), a polling frame, CFP, CP phases, and an end of CFP flag (E). The beacons maintain synchronization and carry protocol parameters. Enhanced DCF (EDCF) accesses take place during the CP phase, and Hybrid Coordination Function (HCF) accesses are performed during either the CFP or CP phases.

Data are transmitted on medium 103 during Transmission Opportunities (TXOPs) selectively allocated to enhanced stations 302a,b . . . N. A TXOP is a time period defined by starting time and maximum duration parameters during which a station 302a,b . . . N receiving a TXOP allocation is allowed to initiate transmissions of multiple MPDUs. TXOPs are allocated via contention during EDCF accesses and by polling during HCF accesses.

Enhanced stations 302a,b . . . N support multiple transmission queues (virtual stations) which prioritize data by Traffic Categories (TCs) based on QoS parameters. During the CP, each TC within a given enhanced station 302a,b . . . N contends for a TXOP by detecting a channel idle condition for an Arbitration Interframe Space (AIFS) period, which has a minimum value equal to the DIFS and thereafter counting down from a corresponding independent random backoff counter value. If the backoff counters for two or more TCs within the enhanced station 302a,b . . . N reach zero at simultaneously, a virtual collision within that enhanced station 302a,b . . . N will occur. Virtual collisions are resolved by an enhanced-station internal scheduler, which grants the TXOP to the TC in accordance with an algorithm similar to that used to determine access to the shared medium. A TC with a higher priority typically has a higher probability of being allocated the next available TXOP. (Resolution of virtual collisions is independent of resolution of collisions between different enhanced stations 302a,b . . . N on the shared medium).

The 802.11e standard also provides for controlled contention resolution. Generally, controlled contention allows AP/HC 301 to determine the times and durations for polling given enhanced stations 302a,b . . . N based on information periodically updated by those stations. Consequently, stations 302a,b . . . N are allowed to request allocation of polled TXOPs.

As previously indicated, multipath fading is a significant problem in shared medium communications systems, including WLANs. Spatial diversity is one technique commonly used to mitigate the effects of multipath fading. In spatial diversity, multiple antennae, spaced apart as a function of the signal wavelength, are utilized to create independent fade paths between the transmitting node and the receiving node. The antenna configuration, which is predicted to produce the best reception characteristics, is then selected for the transmission. For example, in 802.11 compliant networks, the most predominant solution is to implement a receive diversity algorithm which determine the strength of the signal appearing at each receive antenna and thereby selects the antenna which should provide the best reception as a function of signal strength. However, this technique is difficult to implement in some networks because of constraints on the time available to initially receive the preamble of the data packets and then select the appropriate antenna before the data payload arrives. A second simpler receive diversity algorithm selects the first antenna to receive a signal as the receive antenna. In high multipath environments, the probability of selecting the wrong antenna is significant when this second technique is utilized.

In a transmit diversity scheme, an algorithm selects the transmit antenna predicted to provide the best independent fade path to the receiving node. One conventional technique is to simply select the last antenna used by the transmitting terminal (for either transmission or reception) prior to transmitting the current signal. This technique does not work well in multiple-node networks since the last-used antenna at the transmitting node has exchanged a signal with any one of the other nodes in the system, which may or may not be the best antenna for establishing a path to the current receiving node.

Continuing with the example in which Station 102a of FIG. 1 is the transmitting station and Station 102b is the receiving station, under the 802.11 network protocol an acknowledgement packet is returned to transmitting Station 102a from receiving Station 102b when a directed unicast packet or set of packets (in the case of 802.11e compliant transmission) has been received successfully. Receiving Station 102b must send this acknowledgement packet back to transmitting Station 102a within the (Short Interframe Space) SIFS time interval shown in FIGS. 2A and 2B. The SIF time interval is typically on the order of 10 microseconds in length. In the case of 802.11e compliant systems, such as system 300 shown in FIG. 3, the acknowledgement packet (the burst ACK) additionally contains information identifying which packets of the set of packets transmitted were successfully received. In either case, if the acknowledgement packet is not received in the corresponding SIF time interval then the MAC layer generates an interrupt and the packet or set of packets is retransmitted by transmitting Station 102a. Typically, on retransmission, the packet or set of packets is transmitted at a lower data rate to take advantage of the processing gain afforded with lower data rates.

According to the principles of the present invention, when a retransmission of a packet or set of packets is required, a switch is performed between a current antenna such as antenna 106a of Station 102a to another antenna, such as antenna 106b associated with the transmitting Station 102a. The retransmission is performed through the antenna 106b at the same data rate as the original transmission through antenna 106a. However, if on retransmission, no acknowledgement is received from the receiving Station 102b, then a further retransmission is performed using either a third antenna associated with the transmitting Station 102a, when available, or by switching back to the original transmitting antenna 106a. In the case that original transmitting antenna 106a is utilized for retransmission, then the data rate for the retransmission of the current packet or set of packets is reduced. One particular embodiment of the present invention, utilizing a pair of transmission antennas 106a and 106b, is illustrated by the select transmit antenna procedure 500 shown in FIG. 5A-5C, although the inventive principles can be extended to systems in which stations 102a,b, . . . N are associated with three or more antennae.

Figure 5A:
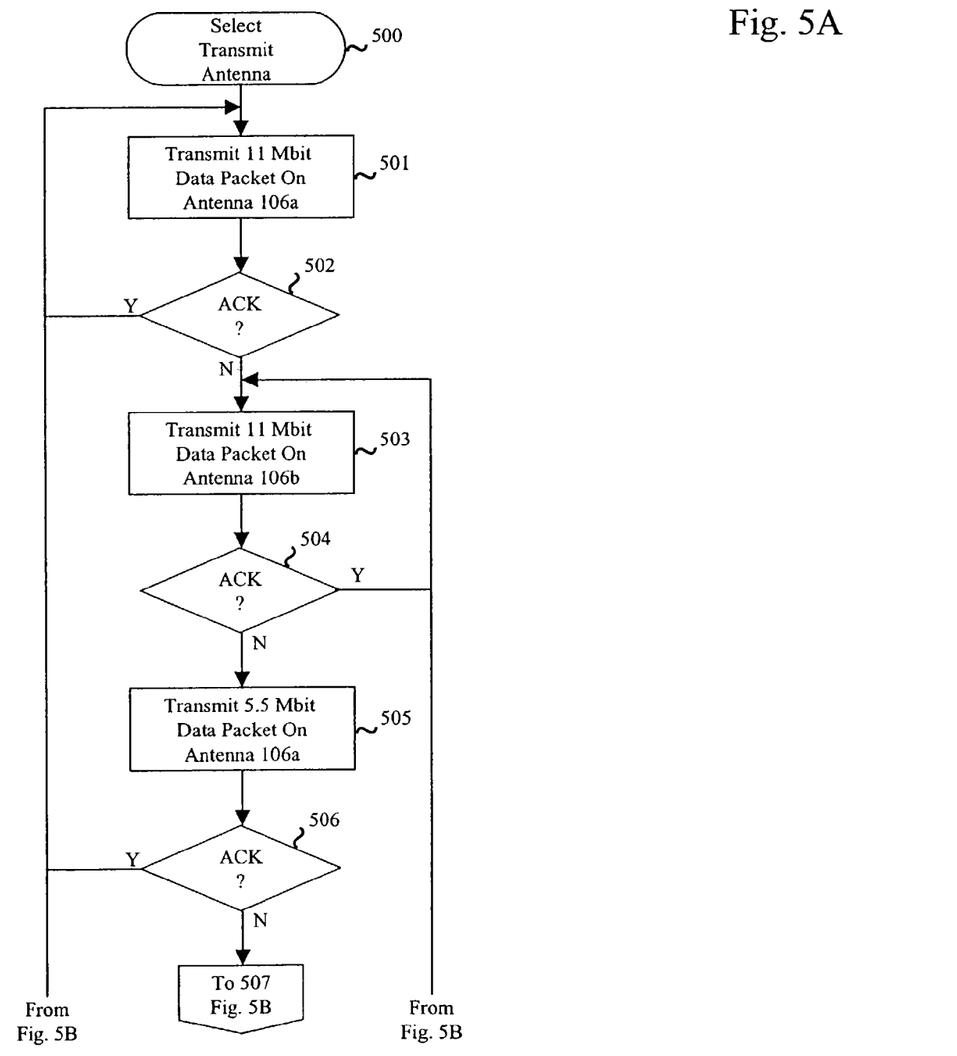
FIG. 5 is a flow-chart illustrating a representative transmit diversity technique according to the principles of the present invention and suitable for application in the systems shown in FIGS. 1 and 3.

At Block 501, a full data packet or set of data packets, which in this example consists of eleven megabits of data, is transmitted on antenna 106a of transmitting Station 102a. If at decision Block 502, an acknowledge (ACK) signal is successfully received from the receiving Station 102b, then the transmission is successful and the selected transmitting Station 102a continues to operate from the associated antenna 106b. On the other hand, if no acknowledgement is received at condition Block 502 after the expiration of the SIFS interval, then transmitting Station 102a switches to associated antenna 106b and attempts to retransmit the full eleven megabit data packet on antenna 106b at Block 503.

Transmitting Station 106 waits for an acknowledgement at condition Block 504 from target receiving Station 102b in response to the transmission of the eleven megabit packet on associated antenna 106b performed at Block 503. If the appropriate acknowledgement is received by transmitting Station 102a, then antenna 106b remains the active antenna for transmitting Station 102a and the procedure returns to Block 503 such that the next attempt to transmit an eleven megabit packet by Station 102a is performed using antenna 106b. On the other hand, if no acknowledgement is received from receiving Station 102b within the corresponding SIFS time interval at condition Block 504, then transmitting Station 102a switches the active transmit antenna back to associated antenna 106a and the data transmission rate is reduced at Block 505. In this example, the reduced data transmission rate corresponds to the attempted retransmission of a 5.5 megabit data packet or set of data packets.

Figure 5B:
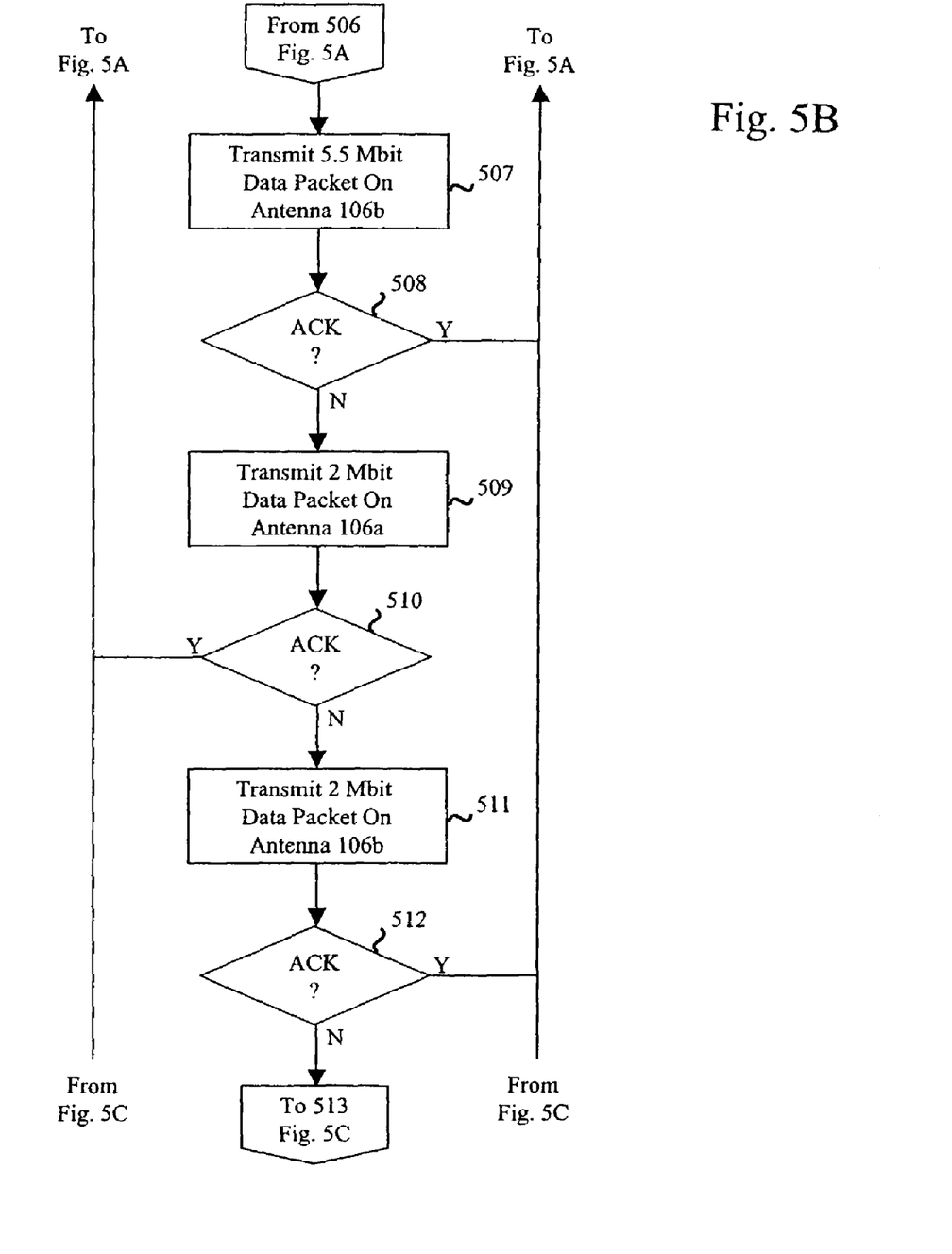

The transmitting Station 102a awaits an acknowledgement within the corresponding SIFS interval, in response to the reduced data rate transmission on antenna 106a at condition Block 506. If the reduced data rate transmission from antenna 106a is successful, then procedure 500 loops back to Block 501 and antenna 106a is retained as the transmission antenna for the next attempted eleven megabit data packet. Otherwise, procedure 500 continues to Block 507, transmitting Station 102a switches to associated antenna 106b for the transmission and an attempt is made to transmit the 5.5 megabit data packet of set of data packets to the target receiving Station 102b. Transmitting Station 102b then waits through the corresponding SIFS interval, at condition Block 508, for the receipt of the appropriate acknowledgment. In this case, if the 5.5 megabit data transmission from antenna 106b at Block 507 is successful, antenna 106b is retained as the transmission antenna and the procedure loops back to step 503 to await the next transmission by Station 102a of a full eleven megabit data packet or set of data packets. Otherwise, if no acknowledgement is received within the corresponding SIFS interval, then procedure 500 continues on to Block 509.

At Block 509, the active transmitting antenna is switched again to antenna 106a associated with transmitting Station 102a and the data transmission rate further reduced. In representative procedure 500, two megabits of data are transmitted at Block 509. Transmitting Station 102a awaits an acknowledgement within the SIFS interval at condition Block 510. Similar to the prior Blocks in procedure 500, if an appropriate acknowledgement is received at condition Block 510,
then Station 102a maintains antenna 106a as the active antenna and the procedure loops back to block 501. Otherwise, at Block 511, a second attempt is made to transmit the two megabit data packet, after a switch is made to associated antenna 106b. If the transmission at Block 511 is successful, as indicated by an acknowledgement at condition Block 512, then antenna 106b is maintained as the active transmission antenna by Station 102a and the procedure loops back to Block 503. Otherwise, the process of switching antennas and reducing the transmission rate is repeated at Blocks 513-515.

Figure 5C:
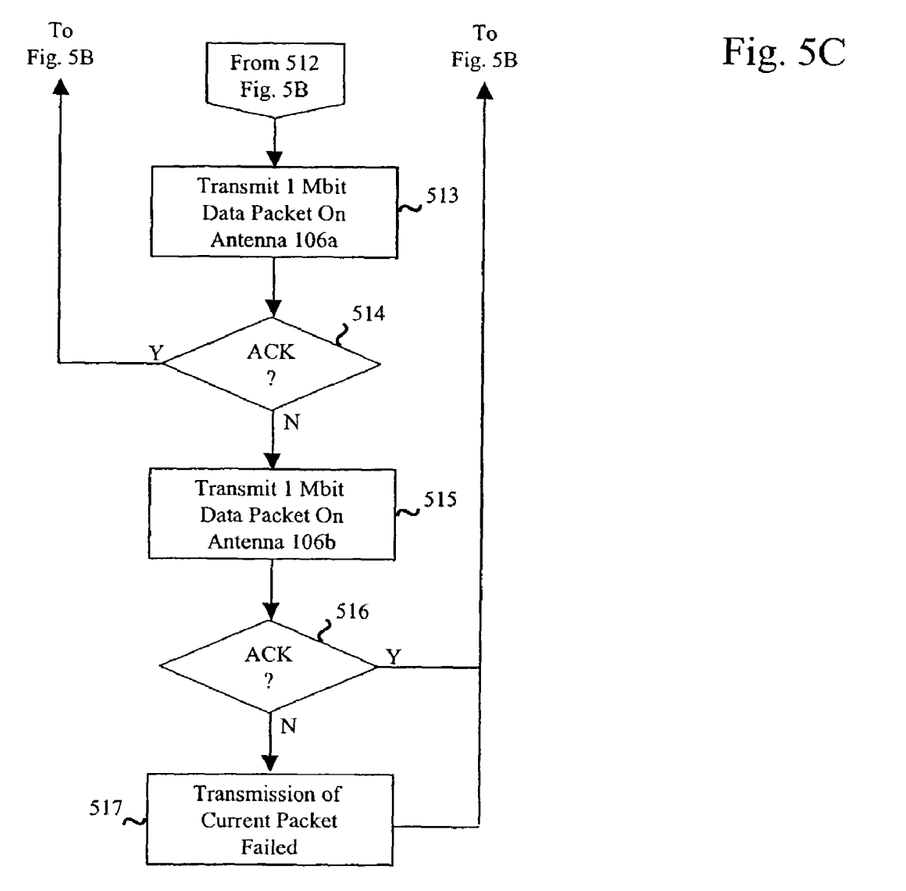

Specifically, at Block 513, the transmitting Station 102a attempts to transmit a one megabit data packet on associated antenna 106a. If the transmission is successfully acknowledged at condition Block 514, then antenna 106a retained as the active antenna and procedure 500 loops back to block 501 to await the next eleven megabit transmission from Station 102a. Otherwise, at Block 515, antenna 106b associated with Station 102a becomes the active antenna for the attempted transmission of the one megabit data packet.

Advantageously, the principles of the present invention are relatively simple to implement in 802.11 compliant networks. Specifically, as noted above, MAC layer generated an interrupt when the transmitting station 102a does not receive an acknowledgement from the receiving station 102b before the expiration of the SIFS interval. This interrupt can be used to perform the antenna switching operations described above. Additionally, the transmit diversity scheme embodied in procedure 500 may be implemented using a closed loop feedback control system which increases the effectiveness of mitigating multipath fading.

In the illustrated embodiment, if the attempted transmission of 1 megabit data on antenna 106b fails at Block 516, then the current transmission is deemed a failure at Block 517.

In alternate embodiments, additional reductions in the data rate, along with switches between transmit antennae 106a and 106b associated with Station 102a, may be performed and additional attempts made to establish the desired communications path.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A transmit diversity method comprising:
   transmitting data at a selected rate from a first antenna;
   awaiting an acknowledgement indicating successful receipt by a receiving terminal of the data transmitted at the selected rate from the first antenna; and
   transmitting data at the selected rate from a second antenna upon failure to receive an acknowledgement, after expiration of a predetermined time interval after transmitting from the first antenna, of successful receipt by the receiving terminal of the data transmitted at the selected rate from the first antenna.

2. The transmit diversity method of claim 1 further comprising:
   awaiting an acknowledgement indicating successful receipt by the receiving terminal of the data transmitted at the selected rate from the second antenna; and
   transmitting data at a reduced rate from the first antenna upon failure to receive an acknowledgement of successful receipt by the receiving terminal of the data transmitted at the selected rate from the second antenna within a predetermined time interval.

3. The transmit diversity method of claim 2 further comprising:
  awaiting an acknowledgement indicating successful receipt by the receiving terminal of the data transmitted at the reduced rate from the first antenna; and
  transmitting data at a reduced rate from the second antenna upon failure to receive an acknowledgement of successful receipt by the receiving terminal of the data transmitted at the reduced from the first antenna.

4. The transmit diversity method of claim 3 further comprising transmitting second data from the first antenna at the selected data rate after receiving an acknowledgement indicating successful receipt by the receiving terminal of the data transmitted at the reduced rate from the first antenna.

5. The transmit diversity method of claim 3, further comprising transmitting second data from the second antenna at the selected rate after receiving an acknowledgement indicating successful receipt of the data transmitted at the reduced rate from the second antenna.

6. The transmit diversity method of claim 2 further comprising transmitting second data from the second antenna at the selected data rate after receiving an acknowledgement indicating successful receipt by the receiving terminal of the data transmitted at the selected rate from the second antenna.

7. The transmit diversity method of claim 1 further comprising transmitting second data from the first antenna at the selected data rate after receiving an acknowledgement indicating successful receipt by the receiving terminal of the data transmitted at the selected rate from the first antenna.

8. A wireless communications system comprising:
  a first terminal for receiving data transmitted across a shared medium;
  a second terminal associated with first and second antennas, the second terminal operable to:
    transmit data at a selected rate from the first antenna;
    await acknowledgement indicating successful receipt by the first terminal of the data transmitted at the selected rate from the first antenna; and
    transmit data at the selected rate from the second antenna upon failure to receive acknowledgement, after expiration of a predetermined time interval following the transmission from the first antenna of the second terminal, of successful receipt by the first terminal of the data transmitted at the selected rate from the first antenna of the second terminal.

9. The wireless communications system of claim 8 wherein the first terminal is further operable to:
  await acknowledgement indicating successful receipt by the first terminal of the data transmitted at the selected rate from the second antenna; and
  transmit data at a reduced rate from the first antenna upon failure to receive an acknowledgement of successful receipt by the first terminal of the data transmitted at the selected rate from the second antenna within a predetermined time interval.

10. The wireless communications system of claim 9 wherein the first terminal is further operable to:
  await acknowledgement indicating successful receipt by the first terminal of the data transmitted at the reduced rate from the first antenna; and
  transmit data at the reduced rate from the second antenna upon failure to receive acknowledgement of successful receipt by the first terminal of the data transmitted at the reduced from the first antenna.

11. The wireless communications system of claim 10 wherein the second terminal is further operable to transmit second data from the first antenna at the selected data rate after receiving acknowledgement from the second terminal indicating successful receipt of the data transmitted at the reduced rate from the first antenna.

12. The wireless communications system of claim 10, wherein the second terminal is further operable to transmit second data from the second antenna at the selected rate after receiving acknowledgement from the second terminal indicating successful receipt of the data transmitted at the reduced rate from the second antenna.

13. The wireless communications system of claim 9 wherein the second terminal is further operable to transmit second data from the second antenna at the selected data rate after receiving acknowledgement from the first terminal indicating successful receipt of the data transmitted at the selected rate from the second antenna.

14. The wireless communications system of claim 8 wherein the second terminal is further operable to transmit second data from the first antenna at the selected data rate after receiving acknowledgement from the first terminal indicating successful receipt of the data transmitted at the selected rate from the first antenna.

15. A wireless local area network comprising:
  a plurality of terminals, a transmitting one of the terminals operable during a transmission to a receiving one of the terminals to:
    transmit data at a first rate from a first antenna;
    switch to a second antenna and re-transmit the data at the first rate from a second antenna if the transmission from the first antenna to the receiving terminal is unsuccessful; and
    switch to the first antenna and re-transmit the data at a second rate if the re-transmission of the data at the first rate from the second antenna to the receiving terminal is unsuccessful.

16. The wireless local area network of claim 15 wherein the transmitting terminal is further operable to transmit second data at the first rate from the first antenna when the transmission to the receiving terminal of the data at the first rate from the first antenna is successful.

17. The wireless local area network of claim 15 wherein the receiving terminal is operable to transmit acknowledgement data to the transmitting terminal within a predetermined time interval following a transmission by the transmitting terminal to indicate success of the transmission by the transmitting terminal.

18. The wireless local area network of claim 15 wherein the data comprises a set of at least one data packet.

19. The wireless local area network of claim 15 wherein the plurality of terminals communicates in accordance with an IEEE 802.11 protocol.

20. The wireless local area network of claim 19 wherein the transmitting terminal switches antennae in response to an interrupt generated by a MAC layer in accordance with the IEEE 802.11 protocol.

* * * * *